Figure 4:
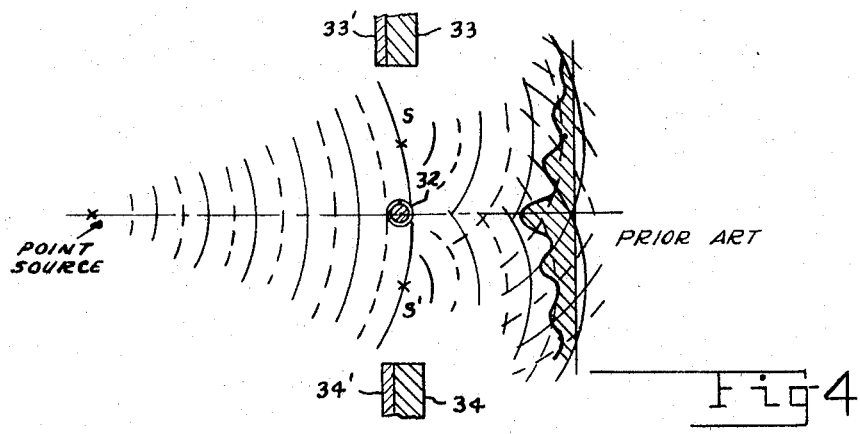

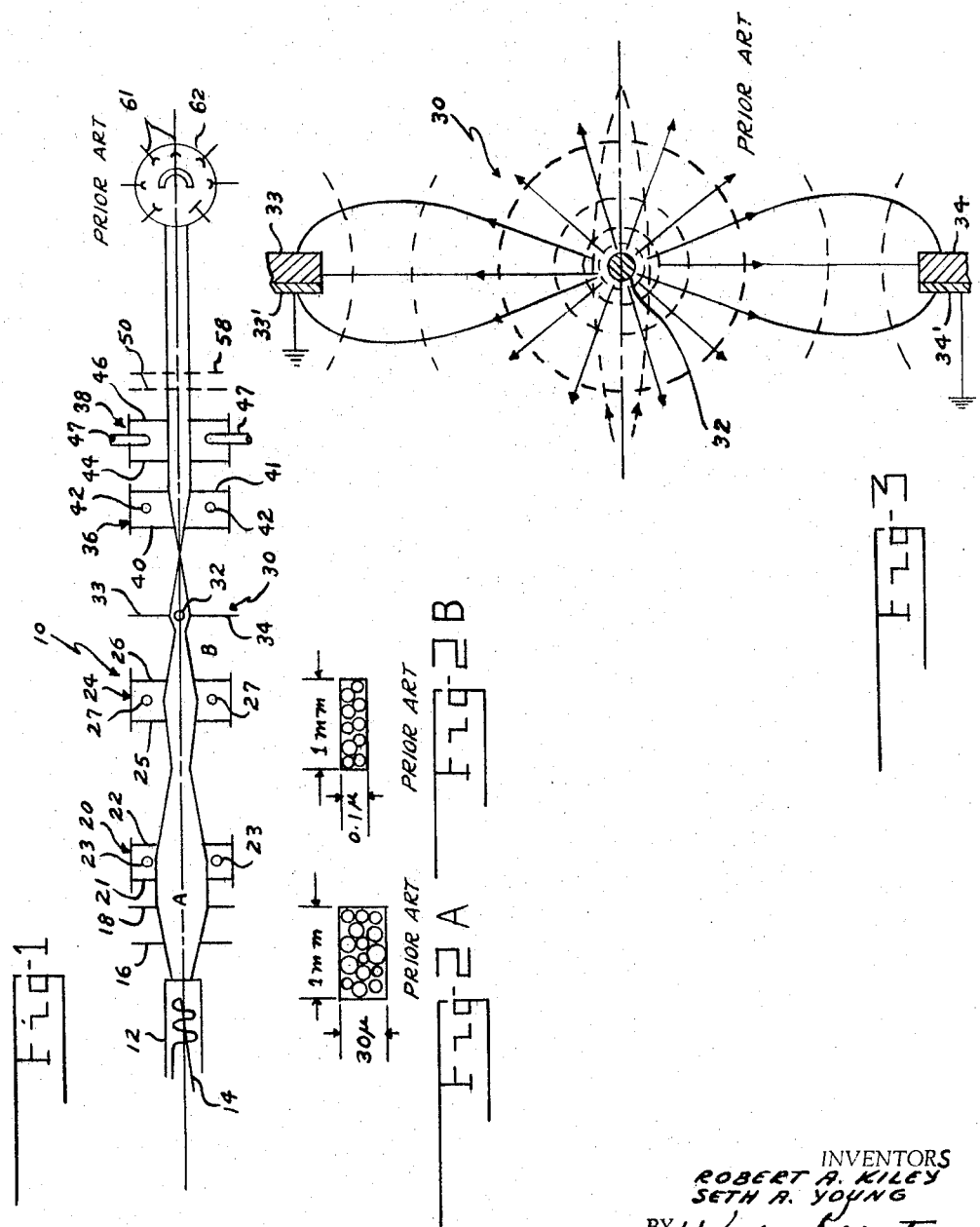

INVENTORS
ROBERT A. KILEY
SETH A. YOUNG

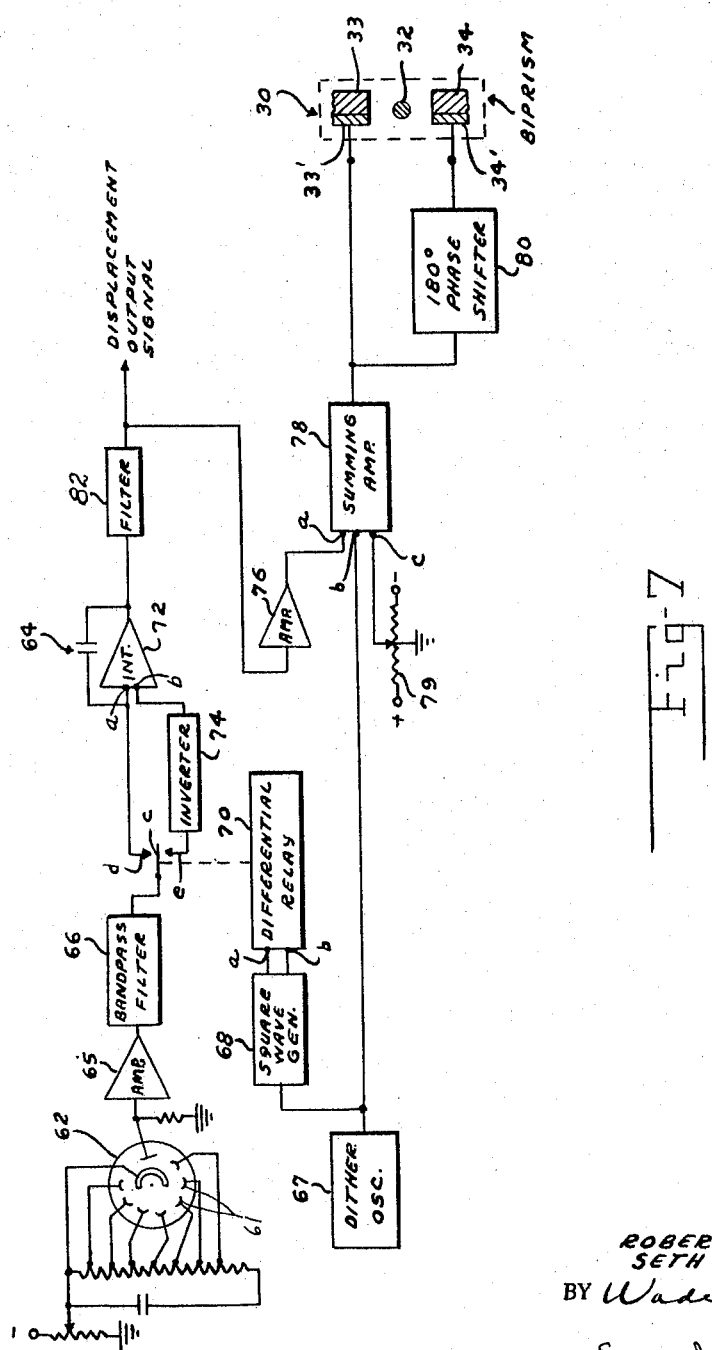

United States Patent Office 3,297,870
Patented Jan. 10, 1967

3,297,870
FEEDBACK CONTROL SYSTEM FOR THE BIPRISM MEANS OF AN ELECTRON-OPTICS INTERFEROMETER
Robert A. Kiley, Alamogordo, New Mexico, and Seth A. Young, Yellow Springs, Ohio, assignors to the United States of America as represented by the Secretary of the Air Force
Filed June 12, 1964, Ser. No. 374,861
5 Claims. (Cl. 250—49.5)

The invention described herein may be manufactured and used by or for the United States Government for governmental purposes without payment to us of any royalty thereon.

This invention relates to measuring devices and, particularly, to an electron optics interferometer making possible very precise measurements.

Interferometers are widely known for producing and showing interference between two or more wave trains coming from the same large luminous area, and also for comparing wave lengths with observable displacements of movable parts. In classic light optics, such experiments have shown that when optical energy emanating from a point source is split into two beams which travel over paths of different length to the same image plane where they are then recombined, alternate interference fringes of brightness and darkness are produced according to changes in the path lengths. A biprism is customarily employed for splitting the beam. The biprism creates the illusion of two separate luminous point sources. The superimposition of the two luminous beam generates a distinctive pattern of high and low intensity fringe lines appropriately called an interference pattern.

Considerations applicable to experimental conclusions in light-optics devices may analogously be applied to electron-optics devices which, rather than optical energy, employ a beam of moving particles from which the interference pattern is formed. Since, according to the De Broglie theorem, moving particles may be associated with the characteristics of electromagnetic and light waves, a particulate beam in accelerated motion is considered to consist of well-defined particles of finite size exhibiting wave characteristics.

Accordingly, one object of the invention is to provide an interferometer which uses a split beam of particles rather than a split beam of light.

A further object of the invention is the provision of an electron-optics interferometer of which very little additional interpretation is required by the operator.

Still another object of the invention is to provide an electron-optics interferometer having no moving parts and whose output voltage directly relates to fringe displacement.

Yet another object of the invention is the provision of an electron-optics interferometer from which fringe information is extracted by other than photographic means.

A feature of the electron-optics appartaus comprising the invention permits the measurement of extremely small displacement patterns about a reference position. Among other things, a feedback circuit centers upon the use of a dithering or oscillating signal to move the interference pattern sinusoiadlly a small fraction of a fringe width. The dithering of the interference pattern gives an output voltage which, when modulated at the dither frequency, appreciably increases the $s/n$ ratio. The output voltage can be interpreted to obtain indirect measurements of the driving force responsible for the displacement of the interference fringe pattern.

Figure 5:
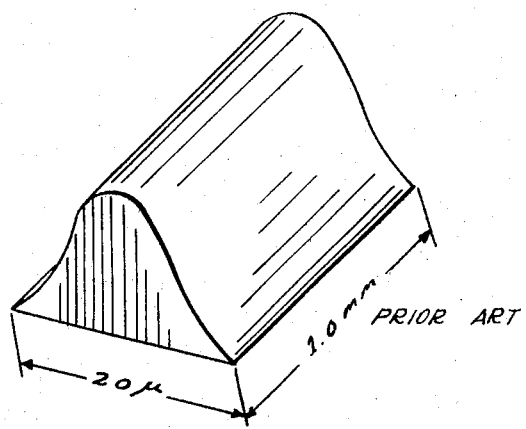
Figure 6:
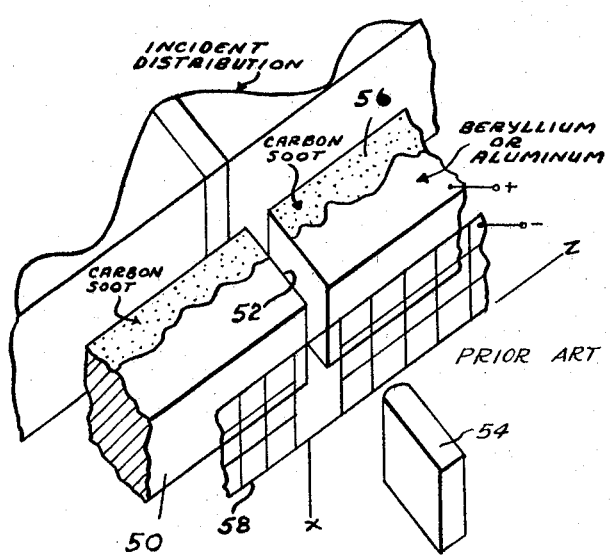

A complete understanding of the invention and an introduction to other objects and features not specifically mentioned may be had from the following description when read in conjunction with the accompanying drawings, wherein:

FIG. 1 is a preferred form of electron-optics apparatus for producing interference effects;
FIGS. 2A and 2B are cross-sections of the electron beam at selected points in the apparatus of FIG. 1;
FIG. 3 shows the electric field in the vicinity of the biprism by which the electron beam is split;
FIG. 4 illustrates the fluctuations in the interference pattern produced by the biprism;
FIG. 5 illustrates the sine-squared energy distribution of the interference pattern;
FIG. 6 is a view showing specific details of certain parts of the apparatus embodied in FIG. 1; and
FIG. 7 is a diagram of one form of feedback control system.

Referring now to FIG. 1, an electron-optics interferometer generally referenced 10 includes an electron source defined by a cathode 12 heated by a filament 14. The beam passes through an accelerating anode 16 to which, in a well known manner, an accelerating voltage is applied. The diverging field near the anode 16 intercepts an apertured mask 18 which shapes the electrons into a rectangular beam. The source of electrons and anode 16 may be assumed representative of corresponding elements found in conventional electron guns. Mask 18 simply permits only a portion of the electrons to pass. All others which collide with the mask are conducted in any suitable manner from the vicinity of the beam-defining region to prevent formation of a space charge.

As an example of the delimitation caused by mask 18, the electron stream is formed with dimensions roughly $30\mu$ by 1.0 mm. As illustrated in FIG. 1, the first-named dimension, hereinafter identified as being in the z-plane, will be considered for purposes of this specification to be vertically perpendicular to the axis of the beam; the second dimension, hereinafter identified as being in the x-plane, will be viewed as cutting through the axis of the beam perpendicular to the drawing plane. A cross-section of the beam at reference point A, i.e., looking back into mask 18 from a point downstream of the mask, is shown in FIG. 2A.

The rectangular beam adjacent mask 18 submits to two stages of demagnification in the z-plane. This demagnification is brought about by tandemly-disposed electrostatic cylindrical lenses 20 and 24. The first lens 20 is closed at both ends by apertured disks 21 and 22 between which is positioned oppositely-disposed electrodes 23 insulated electrically from the end disks 21 and 22. In a similar manner, lens 24 includes apertured disks 25 and 26 between which oppositely disposed electrodes 27 insulated electrically from both end disks 25 and 26 are positioned. In practice, the inner disks 23 and 27 are maintained positive relative to the end disks associated therewith.

The cylindrical lens 20 forces the electrons to converge toward the axis in a well known manner compressing the beam to a smaller dimension in the observation field of the second lens 24. In lens 24 the electron stream is still further demagnified. Through the combined action of condenser lenses 20 and 24, strong demagnification is achieved in the z-plane. It, therefore, will be appreciated that the size of the beam near the exit end of lens 24 is considerably smaller than the beam size defined by the mask 18. The two stages of demagnification reduce the size of the beam in the z-plane to about $0.1\mu$, a compression of approximately 300×. A cross-section of the beam subsequent to the second stage of demagnification, i.e., at reference point B, is shown in FIG. 2B. Practical considerations prevent showing the actual sizes of the beams in FIGS. 2A and 2B. The dimensional change is shown merely by a slight adjustment in the size of the beam in the z-plane.

In the path of the demagnified beam is an electron-optical biprism generally indicated 30 whose electrical field splits the beam into two parts. The beam particles then travel along different paths and recombine to form an interference pattern. A biprism of the type shown in the interferometer apparatus of FIG. 1 is disclosed by Moellenstedt and Dueker in the German publication "Zeitschrift fur Physik," Nr. 145, 1956, pp. 377–397, which has been translated to the English by the Translation Service Branch, Foreign Technology Division, Wright-Patterson Air Force Base, Ohio, as publication FTD–TT 62–999, October 30, 1962, under the title "Observations and Measurements on Biprism Interferences With Electron Waves." As shown in the present application, biprism 30 comprises an electrically-conductive filament 32 whose axis is disposed perpendicular to the drawing plane, i.e., in the x-plane. The filament axis itself is perpendicular to the path of the beam. Filament 32 in the preferred embodiment is clamped and insulated from oppositely-disposed electrodes or jaws 33 and 34 of electrically-insulating material, such as quartz, the leading edges of which are coated with electrically-conductive films 33' and 34' (FIG. 3) respectively, such as silver or gold. Filament 32 is extremely fine, on the order of $2\mu$ or so in diameter and, in one known method of fabrication it is made by condensing a small quantity of metallic vapor on a fiber made, for example, of quartz. An enlarged view of biprism 30 and the electric field by which deflection of the particles occurs is shown in FIG. 3. As illustrated therein, biprism 30 includes filament 32 centrally disposed between the electrodes 33 and 34, the coatings 33' and 34' of which, for illustration only, are connected to ground. By means of a positive voltage to the metal sheath on filament 32, the beam is split in two so that the halves overlap each other at the downstream end of the biprism in such a manner to produce the interference pattern of FIG. 4. The three electrically-conductive elements of biprism 30 are electrically insulated from each other to permit their separate energization, as will be brought out hereinbelow.

Whether the beam is considered to consist merely of finite, well-defined particles or whether from De Broglie wave theorem considerations, the beam is explained as consisting of moving particles having a predictable wavelength and exhibiting all the characteristics of electromagnetic and light waves, it will be understood that in either case the electrical field in the environs of the biprism 30 induces propagation of the beam energy along separate paths, after the manner of FIG. 3, and that these segments overlap in a manner analogous to light-optics phenomena to form fringes of different intensity.

The interference pattern produced by biprism 30 is magnified twice, first being magnified in the z-plane by a cylindrical electrostatic lens 36 and then being magnified in a perpendicular direction, i.e., the x-plane, by a cylindrical electrostatic lens 38. Lens 36 is closed at both ends by apertured disks 40 and 41 between which are oppositely-disposed electrodes 42 insulated electrically from end disks 40 and 41. To achieve magnification, electrodes 42 are maintained negative relative to end disks 40 and 41 rather than positive, as was the case for the demagnifying lenses 20 and 24. In a similar manner, lens 38 comprises apertured end disks 44 and 46 between which, in electrical insulating relation, are mounted oppositely-disposed electrodes 47 oriented at right angles relative to the corresponding electrodes of the preceding three lenses. Accordingly, it will be understood that the electric field due to the relative potentials energizing lens 36 magnifies the interference pattern in the z-plane. A magnification of about 1000× by lens 36 is acceptable. Magnification of the interference pattern in the x-plane improves the linearity of the interference pattern and is preferred due to the difficulty of fabricating the center filament of the biprism free of variations in diameter along its entire length. Such inhomogeneity in the diameter of filament 32 is believed to introduce nonuniformities in the electrical field, causing the fringes to be slightly curved. However, with the interference pattern magnified in the x-plane on th order of 10×, the appearance of curvature in the fringes is minimized.

Those skilled in the art will understand that the energy distribution of the interference pattern of FIG. 4 corresponds to a number of parallel bright and dark bands called "fringes," the brightest being in the center between equidistantly-spaced outer ones whose intensity is inversely proportional to the distance from the center of the interference pattern. Increasing the potential of filament 32 relative to the electrode coatings 33' and 34' makes the interference pattern broader (so that more fringe lines appear each side of center); on the other hand, the interval between adjacent fringes becomes smaller. An excellent reproduction of a two-slit interference pattern is given in FIG. 9–2(b) of "Optics," by F. W. Sears, Addison-Wesley Press, Inc., Cambridge, Massachusetts, 1949.

In the preferred embodiment, the interference pattern at the downstream end of lens 38 has well over ten fringes each separated from its neighbor by an interval of about $20\mu$. The dimension in the x-plane is on the order of 1.0 mm. For illustration, a single interference fringe is shown in FIG. 5. The interference pattern falls on a slit mask 50 located adjacent lens 46. Mask 50 is provided with a plurality of slits 52 (FIG. 6) whose sides are parallel to the beam axis. Suitable approximate dimensions for the slit may be $1.0\mu$ in the z-plane and 1.0 mm. in the x-plane. In order to avoid complications in the drawing only one slit is illustrated in FIG. 6. However, more than one slit will be understood to exist on both sides of the center slit.

The electrons which coincide with the position of a slit pass to the other side of mask 50. This is illustrated in FIG. 6 by the beam segment 54. Thus, the beam energy that emerges from each slit represents only a fraction of the interference pattern and its magnitude depends on the intensity of the fringe coincident with the slit. On the other hand, those electrons of the interference pattern which collide with the solid portion of mask 50 are absorbed. Mask 50 may be in the form of a metal block of beryllium or aluminum having a thickness greater than 0.001 inch. The minimum thickness of mask 50 depends on the ability of the mask to prevent particle penetration therethrough, and also on its capacity for dissipating heat arising through collision of the beam particles. Beryllium has the advantage of a low secondary emission factor. The surface of mask 50 is preferably coated with a layer of electron absorption material 56; carbon soot has been found suitable for this purpose. A large percentage of the electron absorption is accounted for by the metallic mask and its carbon exterior. Those electrons which strike the mask without being absorbed rebound as secondary electrons of greatly diminished energy. A grid 58 disposed adjacent the downstream end of mask 50 collects those low-velocity secondary and thermal electrons which escape being attracted to the mask. Grid 58 is charged negatively with respect to mask 50 so that its E-field opposes the flow of this current. The mesh of grid 58 should be kept very thin, say on the order of 2 or $3\mu$ in diameter. As shown in FIG. 6, the grid is arranged to be free of any mesh adjacent the area delimited by each slit. The separation of grid 58 from the mask 50 will in practice be very small, such as a few hundredths of an inch.

The electron energy from mask 50 passes grid 58 and falls on the photocells 61 of an electron multiplier tube 62 which, structurally, is similar to well known electron multiplier phototubes. As one example, model 541W, manufactured by Electro-Mechanical Research, Inc., provides the desired service. The interference pattern passing through the slits of mask 50 is thereby amplified with the amplification coinciding with the position of each unit.

As shown in FIG. 7, the output of multiplier 62 is fed to a feedback control system generally indicated 64. In the form of the feedback control system shown in FIG. 7, the output of multiplier 62 is fed to an amplifier 65 coupled to a bandpass filter 66 assumed ideally to have no attenuation in the bandpass. A circuit which has proved satisfactory for use as filter 66 is a constant-$k$ T-section having a center frequency $f$ and a bandpass between the limits $f+f'$ and $f-f'$; where $f$ and $f'$ are 400 and 5 c.p.s., respectively. The selection of the bandpass for filter 66 is governed by the frequency of an oscillator 67 which generates a sinusoidal signal $$E \sin \beta t$$

where $\beta$ is equal to $2\pi f$ and E is on the order of 10 volts. Oscillator 67 may further be defined in terms of its effect on the circuit of FIG. 7. That is, it generates a signal referred to hereinafter as the "dither" frequency, where the term "dither" as here used simply means that the interference pattern will oscillate about a quiescent point and that the magnitude of the current will also be oscillatory. In this manner, the position of the high intensity lines of the interference pattern may more readily be determined. As described previously, the line of greatest intensity is in the middle of the interference picture. However, because even the slightest movement of the elements of the apparatus of FIG. 1 is capable of making the interference fringes disappear from the viewing plane, the position of the fringes may be determined with less difficulty by "dithering" the constant voltage controlling the path of the beam. The frequency stability of oscillator 67 should be greater than 0.1% to reduce phase shift. Although not specifically shown, it will be obvious that the value of E may be made variable to facilitate determination of the optimum value of the dither voltage. A voltage corresponding to a dither shift between 0.1 to 0.3 fringe widths is permissible.

Oscillator 67 is coupled to a conventional square-wave generator 68 which produces a square wave in synchronism with the sinusoidal variations of the dither frequency. The square wave provides the twin input levels for a differential relay 70 represented herein as having two input terminals $a$ and $b$. A movable arm $c$ of relay 70 may close with either of two fixed contacts $d$ and $e$, as well known in the art. The arrangement is such that when terminal $a$ becomes more positive than terminal $b$, arm $c$ moves into engagement with one of the fixed contacts, say contact $d$. When terminal $b$ becomes more positive than terminal $a$, the converse is true and arm $c$ engages contact $e$. The operation of relay 70 is conventional. A differential relay circuit suitable for use in the present invention is illustrated in FIG. 7–1, p. 108, of "Analog Computer Techniques," by Clarence L. Johnson, McGraw-Hill Book Company, Inc., New York, 1956.

Accordingly, those skilled in the art will understand that relay 70 is essentially a two-position switch. Thus, in the present embodiment, the character of the square-wave signal of generator 68 is such that the output of filter 66 is fed to terminal $a$ of a typical integrator 72 over the period zero to $\pi$ radians of the square wave. That is to say, the controlling voltage to relay 70 is such that terminal $a$ becomes more positive than terminal $b$. On the other hand, from $\pi$ to $2\pi$ radians of each cycle of generator 68 the output of filter 66 is applied to terminal $b$ of integrator 72 by means of a conventional inverter 74 which changes the phase of the signal by 180 degrees. Thus, differential relay 70 switches the output of filter 66 in synchronism with the half periods of the dither frequency. The feedback correction voltage and the output signal are generated by integrating the out-of-phase signals of filter 66 over the full period of the dither frequency.

The output of integrator 72 is fed to a low-pass filter 82 having a cutoff frequency on the order of $\beta$ radians/second. One suitable form of filter 82 is an M-derived half section. This filtering rejects any noise and $\beta$-frequency signals from the output signal of integrator 72. The output of filter 82 is a voltage whose instantaneous magnitude is proportional to the instantaneous value of the change in length of one of the paths in biprism 30, as will be described below when the operation of the apparatus of FIG. 1 is considered coincident with the operation of the feedback control system. Moreover, the polarity of the voltage is directly related to the direction (right or left) of displacement of the fringes of the interference pattern.

The feedback voltage of the over-all circuit 64 is developed at the output connection of filter 82 and is fed through a variable gain amplifier 76 to one input terminal $a$ of a suitable summing amplifier 78. The gain of amplifier 76 preferably is variable. The frequency response of amplifier 76 extends over the range zero to $\beta$ radians/second. Amplifier 78 is simply an inverter which combines the feedback voltage of amplifier 76 and a dither signal from oscillator 67 as well as the voltage of a variable resistor 79. As viewed in FIG. 7, moving the variable arm of resistor 79 to the left and right respectively produces positive and negative voltages referenced to ground. Resistor 79 is the electrical analog of the displaced work, measuring head, and the like, which provides the unknown variable which is to be determined. It will be appreciated, therefore, that resistor 79 simply represents a convenient application of either positive or negative initial conditions to the summing amplifier.

The output of amplifier 78 is fed over two paths, the first of which includes a connection to one of the jaws of biprism 30 and the second path connecting with the other jaw of biprism 30 by means of a phase shifter 80 which introduces a phase shift of 180 degrees. Biprism 30 as shown in FIG. 7 is identical in all respects to the corresponding elements of the biprism illustrated in the apparatus of FIG. 1. The need for reversing the phase of the voltage fed to the lower jaw of the biprism in FIG. 7 will become apparent from the following.

In the observation plane of the interference pattern of the electron beam the intensity at any one point is determined by the phase difference of the separate beams passing to either side of the biprism filament. Taking $\lambda$ as the wavelength of the electron beam, if the geometric difference in the two paths is an integral multiple of $\lambda$, then a bright fringe is obtained. If on the other hand, the difference in path lengths is an odd multiple of $\lambda/2$ then a minimum is obtained. In the present invention, the biprism may be electrically tilted by applying a voltage to one of the biprism jaws (first removing both grounds). This causes the length of the path adjacent the energized jaw to change in such a way that the fringe pattern shifts in a direction corresponding to the polarity of the voltage applied. While it would be desired to have the length of the other path remain constant, this is not the case observed. In fact, it was found that while applying a negative voltage to one of the jaws changes the deflection angle and consequently shifts the location of the fringes, it is necessary to supply a small additional positive voltage to the other jaw in order to nullify the effect of the changing field on the length of the other path. In this way it is possible to cause phase displacement of the split beam by first changing the voltage applied to one of the jaws and simultaneously introducing a compensation voltage to the other jaw whereby the length of the path on the other side is held essentially constant.

*Operation*

The operation of the feedback control system 64 will now be considered coincident with the above-explained characteristics of biprism 30 as incorporated in the interferometer apparatus of FIG. 1. By means of the dithering signal fed to summing amplifier 78 by oscillator 67 the interference pattern shifts sinusoidally a small fraction of a fringe width about the reference line defined by the maximum intensity center fringe. Stated alternately, by dithering the interference pattern the output of muliplier 62 is modulated at the dither frequency. Filter 66 is sharply tuned over the range 395 to 405 cps. which permits only signals substantially at the dither frequency to pass unattenuated. The output of filter 66 is a sinusoidal wave varying at the dither frequency and having an improved signal-to-noise ratio because of the elimination of spurious signals such as noise.

Relay 70 switches the output of filter 66 first directly to integrator 72 and then through inverter 74. The switching occurs in synchronism with the dither frequency as previously explained. Thus, from zero to $\pi$ radians of each dither cycle the signal of filter 66 is connected directly to integrator 72 and from $\pi$ to $2\pi$ radians it is first inverted by 180 degrees before being applied to integrator 72. Assume now that an initial displacement of the interference pattern is brought about by operating the wiper of potentiometer 79. In other words, from the point of view of the jaws of the biprism 30 the output of summing amplifier 78 changes the magnitude of the voltage applied to the jaws. Arbitrary designations of sign may be assumed; i.e., motion of the wiper of resistor 79 will be taken as causing displacement of the fringe of maximum intensity to one side of the reference center position with now the center position showing only mean distribution of electron energy. Conversely, motion of the wiper in the opposite direction displaces the fringe of maximum intensity to the other side of the center position. The change in distribution of energy in the interference pattern is sensed by multiplier 62 in the usual manner. By means of the feedback connection to terminal $a$ of summing amplifier 78 a correction voltage is introduced to the jaws of biprism 30 whereby the phase displacement of the split beams is terminated. The resulting interference pattern is, therefore, shifted so that the fringe of maximum intensity falls at the center reference position. In either case of directional displacement of the wiper of resistor 79, an output voltage, taken at the output terminal of filter 82, represents a direct measurement of the driving force which causes the interference pattern to be displaced.

Salient features of the invention include the completely electronic nature of the preferred embodiment and an output voltage directly related to fringe displacement. Also, the particle interferometer and the feedback control system have no moving parts since mechanically-defined input variables are converted to their electrical analogs. An additional advantage is that the displacement-related output voltage may be used for other electronic or electrical processes.

Although only one specific embodiment of the invention has been illustrated and described, it will be obvious to those skilled in the art that various changes and modifications can be made therein without departing from the spirit of the invention or the scope of the appended claims.

We claim:

1. An electron-optics interferometer feedback control system comprising: means for generating an electron beam, biprism means in the electron beam path and including two spaced electrically-conductive electrodes and a filament mounted in the space between the electrodes for producing an interference pattern, a detector disposed in the path of the electron beam interference pattern to produce an output signal, a summing amplifier, potentiometer means having a movable wiper arm connected to said biprism electrodes via said summing amplifier for effecting displacement of said electron beam from a predetermined position, oscillatory means having a sinusoidal output connected to said summing amplifier for disturbing the position of said interference pattern at a sinusoidal rate, and feedback means connected between said detector and said summing amplifier for generating a corrective voltage whereby said electron beam is returned to said predetermined position in reaction to movement of said wiper arm.

2. An electron-optics interferometer feedback control system comprising: means for generating an electron beam, biprism means in the path of the electron beam and including two spaced electrically-conductive electrodes and a filament mounted in the space between the electrodes for producing an interference pattern having a center band which defines a reference line, a detector disposed in the path of the electron beam interference pattern to produce an output signal, a summing amplifier, potentiometer means having a movable wiper arm connected to said biprism electrodes via said summing amplifier to effect displacement of said center band to either side of said reference line, oscillatory means having a sinusoidal output connected to said summing amplifier for disturbing the position of said interference pattern at a sinusoidal rate, and feedback means connected between said detector and said summing amplifier for generating a corrective voltage whereby said center band is returned to said reference line to counter movement of said wiper arm.

3. An electron-optics interferometer feedback control system comprising: means for generating an electron beam, biprism means in the path of the electron beam and including two spaced electrically-conductive electrodes and a filament mounted in the space between the electrodes for producing an interference pattern having a center band which defines a reference line, electron multiplier detection means disposed in the path of the electron beam interference pattern to produce an output signal proportional to displacement of said center band from said reference line, a summing amplifier, potentiometer means having a movable wiper arm connected to said biprism electrodes via said summing amplifier to effect displacement of said center band to either side of said reference line, oscillatory means having a sinusoidal output connected to said summing amplifier for disturbing the interference pattern position, and feedback means connected between said detection means and said summing amplifier for generating a corrective voltage whereby said center band is returned to said reference line position in response to movement of said wiper arm.

4. An electron-optics interferometer feedback control system comprising: means for generating an electron beam, biprism means placed in the path of said beam for producing an interference pattern, said biprism means including two spaced electrically-conductive electrodes and a filament mounted in the space between the electrodes for producing an interference pattern, an electron multiplier placed in the path of said interference pattern, means for amplifying the signal from said multiplier, a filter with a relatively narrow band-pass centered on a predetermined frequency, an integrator, an inverter, oscillatory means having a sinusoidal output at said frequency, switching means receiving said sinusoidal output and operating at a rate equal to said frequency for coupling the output of said filter to said integrator during the period zero to $\pi$ radians of each cycle at said frequency and for coupling the output of said filter to said integrator through said inverter during the period $\pi$ to $2\pi$ radians of each cycle at said frequency, a low-pass filter receiving the output of said integrator having a cutoff at substantially said predetermined frequency, the output voltage of said low-pass filter constituting a feedback potential expressing any displacement of said interference pattern, potentiometer means having a movable wiper arm, summing amplifier means interconnecting said electrodes of said biprism means and said wiper arm for shifting said interference pattern accordingly as the position of said wiper arm is changed, said sinusoidal output of said oscillatory means being applied to said summing amplifier means, and means coupling said feedback voltage to said summing amplifier means in such manner that upon shifting of said interference pattern by movement of said wiper arm said feedback voltage tends to correct the phase imbalance of the interference pattern with a force indicative of the position of said wiper arm.

5. The combination of elements as in claim 4 including: a slit mask placed in the path of the interference pattern and disposed on the downstream end of said biprism means and so dimensioned that only fractional segments of said interference patterns pass unrestrictedly to said electron multiplier, and grid means disposed adjacent the downstream end of said slit mask to accomplish secondary electron suppression.

References Cited by the Examiner

"Beobachtungen und Messungen an Biprisma-Interferenzen mit Elektronenwellen," by G. Mollenstedt et al., from "Zeitschrift fur Physik," vol. 145, No. 3, 1956, pp. 377–397 (pages 379–382; 387–391; 396 and 395 relied on.)

RALPH G. NILSON, *Primary Examiner.*

W. F. LINDQUIST, *Assistant Examiner.*